INVENTOR
Thomas F. Widmer

3,262,730
COUPLING DEVICE
Thomas F. Widmer, Monroeville, Pa., assignor to Westinghouse Electric Corporation, East Pittsburgh, Pa., a corporation of Pennsylvania
Filed Aug. 18, 1961, Ser. No. 132,440
9 Claims. (Cl. 294—86.25)

The present invention relates to a coupling or latching device adaptable especially for a linearly moving driving shaft and driven member, and more particularly to a novel coupling device which couples a control rod to its associated drive shaft in a nuclear reactor.

As this description proceeds, it will be apparent that the aforesaid coupling device, as disclosed herein, will be readily adaptable to general usage. In this application, however, the coupling mechanism of the invention is described in connection with a nuclear reactor, particularly of the pressurized water type. In the latter reactor, a core structure is frequently supported within a body of circulating coolant water. The core structure comprises a plurality of elongated fuel elements suspended in parallel fashion therein and a number of control rods suitably shaped to be inserted between selected groups of fuel elements. The fuel elements frequently comprise at least a portion of a fissionable isotope such as $U^{233}$, $U^{235}$ or $Pu^{239}$ in which a controlled chain reaction is initiated, in a well known manner, by atomic reaction thereof with thermal neutrons. The chain reaction is controlled or terminated by adjustment of the aforesaid control rods, which are composed at least in part of thermal neutronic absorbing material, such as cadmium, boron, cobalt or their alloys.

In many of the present neutronic reactors, each neutron absorbing control rod is attached to its associated drive shaft through a separable coupling. The drive shaft is, in turn, raised and lowered by a known form of rod-drive mechanism which usually engages the drive shaft at a location exterior to the reactor. The coupling, as normally used, in provided with a disconnect rod which extends upwardly through the hollow center of the drive shaft to a disconnect button at the top of the drive shaft. By raising the disconnect button and its associated disconnect rod with a remote handling tool, a set of pivoted arms are freed to rotate inwardly and disengage from associated mating shoulders formed in the upper control rod arms. Such a coupling device has many disadvantages. For example, the presence of longitudinal play between the pivoted and the mating shoulders introduces fretting wear due to various accelerations imparted to the control rod; for example, by step-wise motion of the control rod drive mechanism or coolant flow through the core.

Another disadvantage is the normal misalignment, caused by manufacturing tolerances, between a control rod drive mechanism and its corresponding control rod slot in the reactor core, which produces excessive side thrust on the control rod and thus causes excessive wear on the control rod and adjacent fuel assemblies through which the control rod passes. Still another problem results from the bending stresses introduced into the upper control rod arms by the pivoted fingers during the shock absorber action on the control rod following a scram. These bending stresses are sufficiently high to require the use of a special material, such as type 348 stainless steel, for the upper control rod arms.

To minimize hazards in removing the aforesaid fuel elements, it is desirable that the control rods remain in their scrammed or fully inserted positions within the reactor core.

Accordingly, it is the general object of this invention to provide a novel, efficient and inexpensive coupling device.

Another object of the invention is the provision of a novel latching arrangement, adapted to couple a linearly moving driving member to a linearly moving driven member.

It is a more particular object of this invention to provide a novel coupling having compact physical dimensions and which also facilitates engagement and disengagement thereof.

Still another object is to provide a greater bearing area in the latching device joining the coupling and coupled members by means of multiple engaging surfaces arranged in a novel manner.

Still another object of the invention is to provide a flexure arm for the active coupling member of the coupling unit, thereby creating a limited universal joint action which compensates for anticipated misalignments of components being coupled by the coupling device due to normal manufacturing tolerances. This also reduces radial stresses created within the coupling by the misalignment of the components being coupled during operation and use thereof.

A still further object of the invention is to eliminate the longitudinal play within a coupling or latching device having a plurality of active coupling members by furnishing means for applying equal outward pressure on each of the coupling members.

Another object of this invention is to provide a mating coupling to which the latching mechanism is coupled so that no enlargement of the normal cruciform shape of the control rod attains, thereby permitting the removal of any fuel assembly in a neutronic reactor by merely decoupling the drive shaft assembly but without having to remove the control rod adjacent to the fuel assembly being removed.

Still another object of this invention is to provide a locking means to hold a coupling unit in a latched position with the member to be coupled.

Another object of this invention is to provide a secondary means of locking the coupling unit in a latched position to the member to be coupled, in the event of accidental unlocking of the primary locking means.

A still further object of this invention is to provide a separate locking means which is actuatable independently of the means used to unlatch the latching mechanism.

Another object of the invention is to arrange a coupling device for the remote operation thereof.

A further object of this invention is to provide coupling means for a cruciform member or the like, such as a control rod for a neutronic reactor, with a coupling means comprising a tubular member having a plurality of parallel annular teeth formed at one end of the tubular member and pivoting means at the other end of the tubular member, a locking means to urge the annular teeth into complete engagement with mating teeth formed on each arm of the cruciform member, and a releasing means primarily to disengage the locking means and secondarily to prevent the unlatching of teeth on the tubular member from the mating teeth on the arms of the cruciform member.

Briefly, the present invention accomplishes the above cited objects by incorporating an improved and novel coupling unit permanently fixed to or associated with one end of a linearly-moving drive shaft. The coupling unit couples the driving shaft to its associated driven member. The coupling unit extends in a longitudinal direction from the one end of the drive shaft and comprises one or more flexure arms with each flexure arm having a latching member or coupling finger integrally formed at its outer end. The flexure arm has a relatively straight ribbon-type form to permit flexing or resiliency in a transverse direction. Where a plurality of such coupling fingers are employed, they are arranged for flexure radially of the drive shaft. The coupling fingers are formed in one illustrative arrangement from a tubularly shaped member with a plurality of slots cut longitudinally therethrough thereby forming separate coupling fingers. In an illustrative application of the invention there are two separate coupling fingers with two separate, associated flexure arms.

On the outer periphery of the coupling fingers are formed a plurality of parallel, annular grooves or teeth. These teeth, in turn, engage mating teeth formed on the inner periphery of the associated driven member. In this example of the invention for a neutronic reactor, there are four upper control rod arms which are longitudinal extensions of a control rod or driven member having a generally cruciform shape. A disconnect rod extends longitudinally upwardly from the lower end of the coupling unit through the center of the tubularly shaped coupling unit and through the center of the tubularly shaped drive shaft to a tubular member or disconnect button located at the top of the drive shaft with the button being in an accessible location exterior to and above the reactor. Inserted over the lower portion of the disconnect rod is a locking means for the coupling unit comprising a tubularly shaped locking member or button and a locking spring which acts downwardly on the locking button. The locking button is slidably inserted on the disconnect rod below the locking spring. The outer diameter of the locking button is sufficiently large to permit the locking button to contact an annular taper formed on the inner periphery of the coupling fingers opposite the toothed portion of the coupling fingers. Below the locking button is located a tubularly shaped release member or button, which is fixed to the lower end of the disconnect rod. The release button has an outer diameter larger than the diameter of the disconnect rod, thus forming a shoulder which contacts the bottom of the locking button upon raising the disconnect rod a short distance.

A coupling guide associated with the coupling unit is cylindrically shaped and has a number of radial slots formed therein, which extend longitudinally in the coupling guide. Each slot is opened at the bottom and extends upwardly to a point which makes it possible for each slot to receive its corresponding upper control rod arm. The coupling guide is used to position properly the coupling fingers, so that in this example of the invention each coupling finger can properly engage the toothed portions of two upper control rod arms.

In operation, with the coupling unit latched to the upper control rod arms, the locking spring applies a downward force on the locking button, which is in contact with the inner taper on the coupling fingers thereby applying an equal outward pressure on each of the coupling fingers. Thus the outward pressure prevents the unlatching of the coupling fingers from the upper control rod arms. To unlatch the coupling fingers from the upper control rod arms, the disconnect button and its attached disconnect rod are raised with a remote handling tool. The disconnect rod thus raises the release button, which in turn raises the locking button against the force of the locking spring. The release button is raised above the inner taper of the coupling fingers; otherwise, the release button prevents the coupling fingers from disengaging completely from the mating teeth on the upper control rod arms thereby preventing the unlatching of the control rod from the drive shaft. After the release button is raised a short distance above the inner taper of the coupling fingers, the coupling fingers are free to rotate inwardly and disengage from the mating teeth on the upper control rod arms. A lifting force now applied to the drive shaft produces a camming action by the engaged teeth, which forces the coupling fingers inwardly so as to disengage the coupling fingers from the upper control rod arms. The inward rotation of the coupling fingers is permitted through the flexing or resiliency of the flexure arms, which are an integral part of the previously described coupling unit. The release and locking buttons are held in their withdrawn position until the coupling fingers have been lifted above the toothed portion of the upper control rod arms at which time the buttons can be released. The reverse procedure is used to latch the coupling uinit to the upper control rod arms.

Further objects and advantages of the invention become apparent as the following description proceeds, and features of novelty which characterize the invention will be pointed out in particularity in the claims annexed to forming a part of this specification.

For a better understanding of the invention, reference may be had to the accompanying drawings, in which.

Figures 1A, 2, 3:
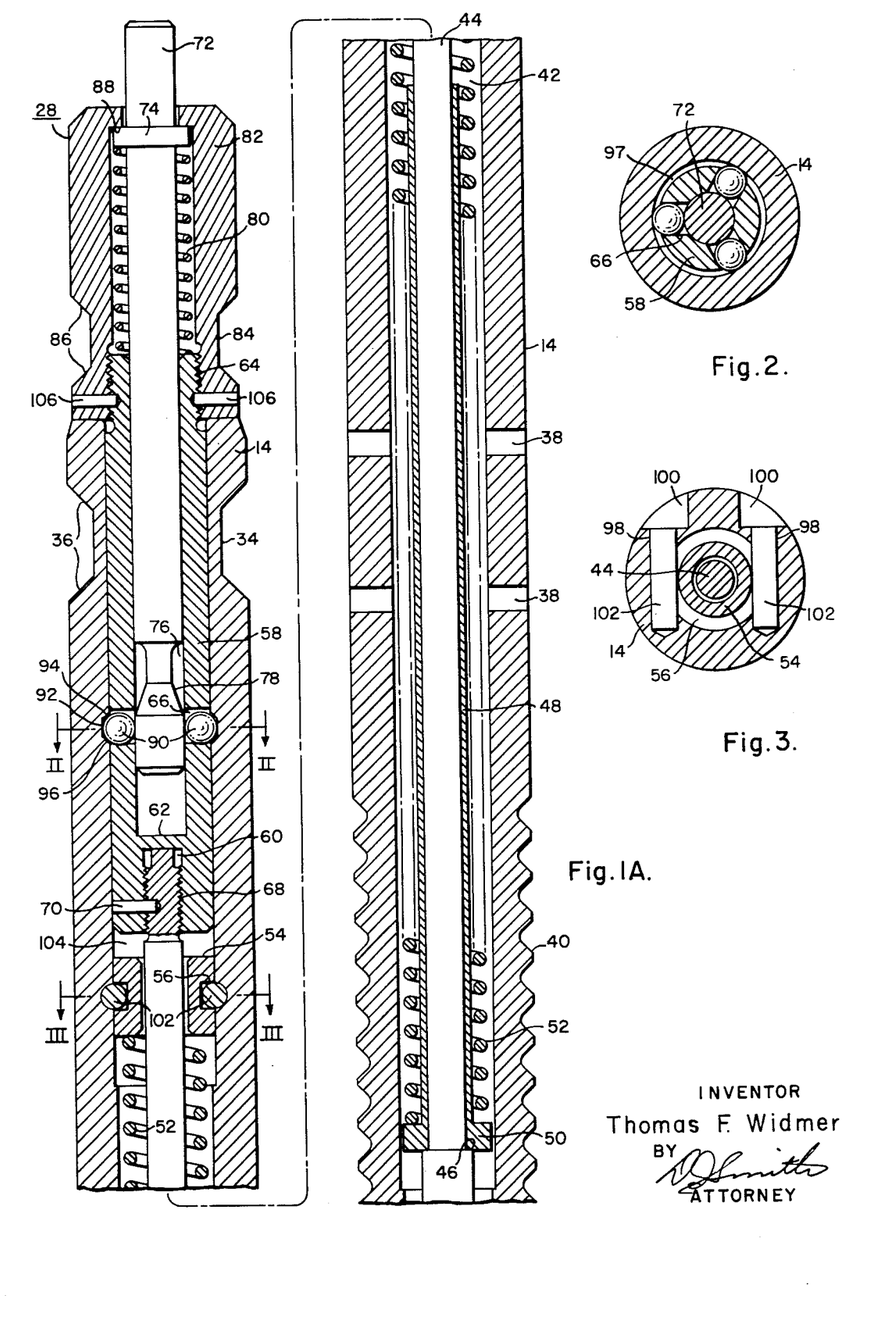
FIGURES 1A, 1B and 1C constitute a tripartite, longitudinal, sectional view of the positive locking mechanism of the invention, a coupling unit, and the intervening parts connecting the locking mechanism to the coupling unit in accordance with the teachings of the invention.
FIG. 2 is a cross sectional view taken along reference line II—II of FIG. 1A and showing the retaining members forced into a groove in the drive shaft.
FIG. 3 is a cross sectional view taken along reference line III—III of FIG. 1A and shows how the top spring retainer is affixed to the drive shaft.
Figure 1B:
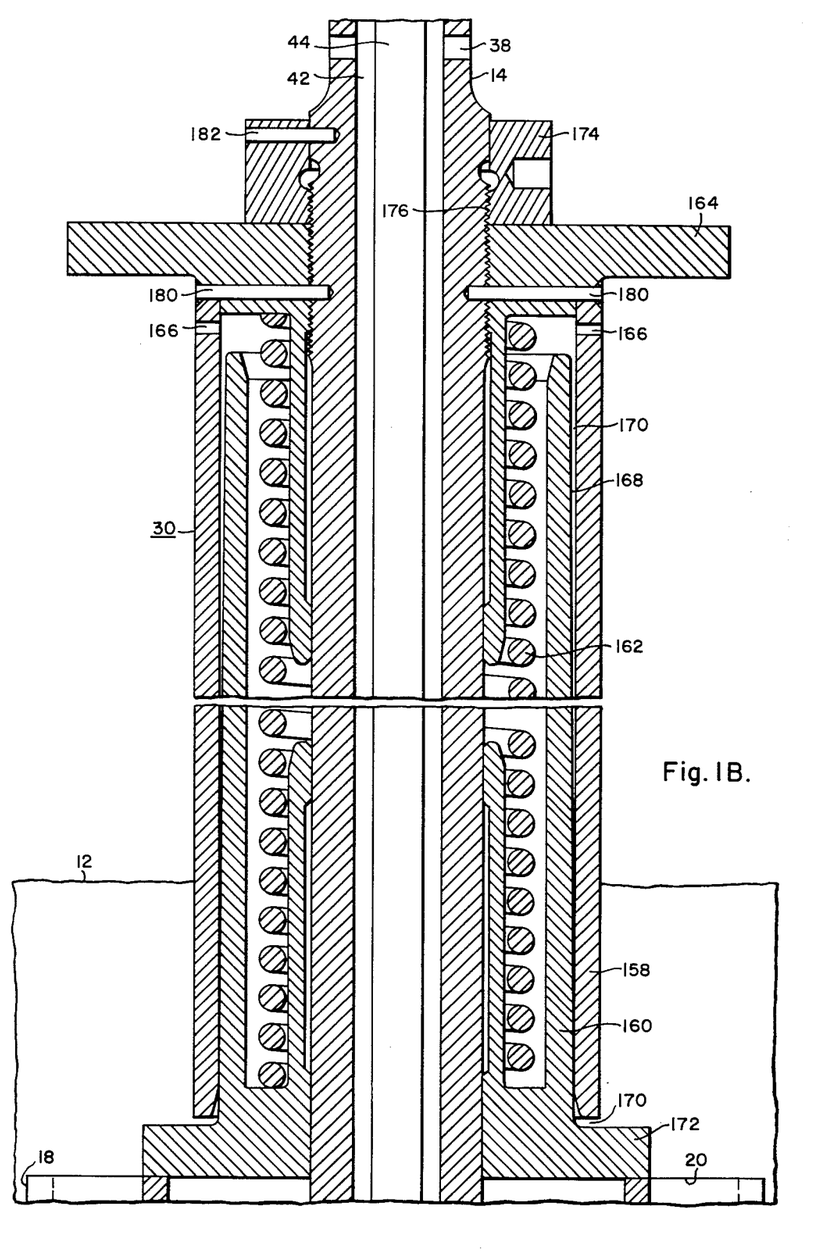
Figure 1C:
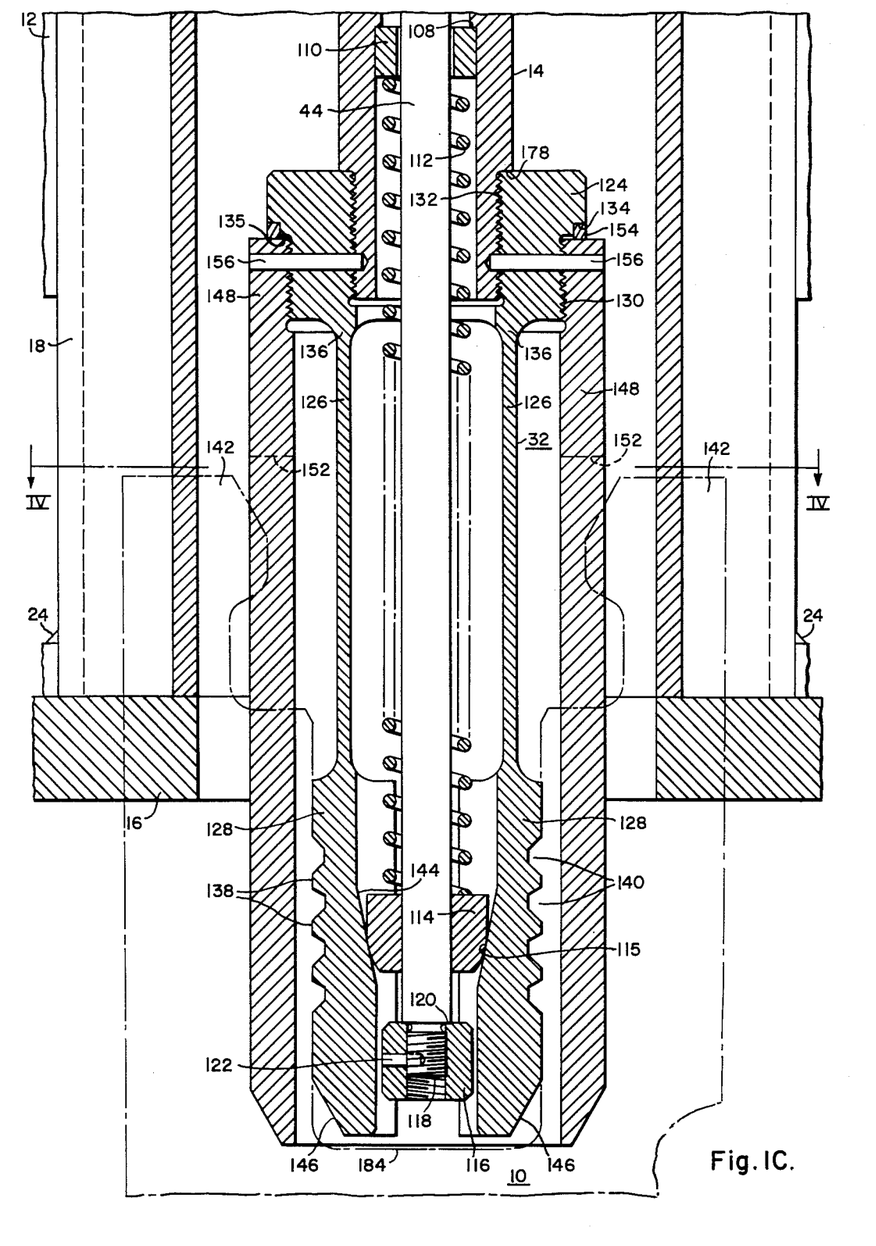

Referring to FIGS. 1 to 4 of the drawings, and more particularly to FIG. 1, the exemplary form of the invention shown therein is adapted for use, in this example with a driven member of control rod 10 having an offset, cruciform cross-section, which is supported for movement within a shroud tube 12 of a generally tubular cross-section by a generally tubular support or control rod drive shaft 14.

Figure 4:
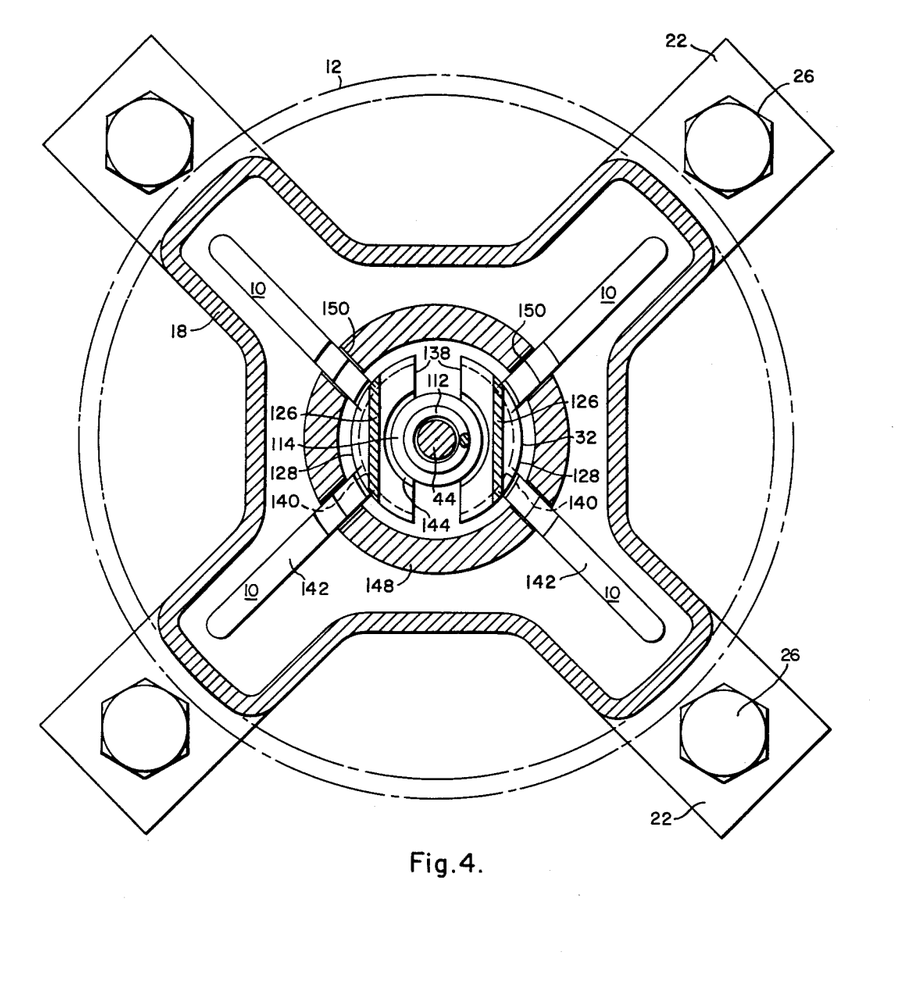
FIG. 4 is a cross sectional view taken along reference line IV—IV of FIG. 1C and shows a cross-section through the upper part of the coupling unit.

For the purpose of this specification, the terms "tubular, tubularly shaped, and tubular member" are definitive not only of a pipe-like structure having a cross section defined by two concentric circles but are also specifically intended to include structures having other cross sectional shapes. In their broad aspects, the aforementioned terms include any member or structure having an opening extending longitudinally through at least a portion thereof. The shroud tube 12 extends upwardly into the upper region of the reactor and is supported by an upper shroud tube supporting plate (not shown). The shroud tube 12 extends downwardly to a point a short distance above an upper core supporting plate 16 and also slidably overlaps a dashpot stop 18 having a generally cruciform shape and through which the control rod 10 passes. The dashpot stop 18 extends upwardly for a relatively short distance above the upper core supporting plate 16 as indicated by the reference character 20 (FIG. 1B) and is secured to the top of the upper core supporting plate 16. For this purpose four generally rectangularly shaped plates 22 are secured to the lower portion of the dashpot stop 18 by weld 24. The dashpot stop plates 22 are, in turn, bolted to the upper core supporting plate 16 by bolts 26 (FIG. 4).

FIG. 1 of the drawings shows the drive shaft 14 and its related components coupled to the control rod 10, which is in its scrammed or fully inserted position within the reactor core (not shown). The components, to be described hereinafter and related to the drive shaft 14, comprise a locking mechanism 28 located at the top of the drive shaft 14, a dashpot 30 extending over the lower portion of the drive shaft 14, and a coupling unit 32 permanently affixed to the lower end of the drive shaft 14 and coupled to the control rod 10.

A known form of control rod drive mechanism (not shown), which drives the associated drive shaft 14, is located above and external to the reactor vessel in a vertical position. The drive shaft 14 extends vertically upwardly from the top of the coupling unit 32 through a central opening in the control rod drive mechanism. A notch 34 is formed on the outer periphery of the drive shaft 14 and is located in the upper portion of the drive shaft 14. The drive shaft notch 34 has camming surfaces 36 formed at its upper and lower ends, which are required in conjunction with a remote handling tool (not shown) used in the removal of the drive shaft 14. A plurality of radial apertures 38, formed in the drive shaft 14, are spaced longitudinally along the drive shaft 14 to permit the escape of water within the drive shaft 14 during a scram operation. A toothed portion 40, formed on the outer periphery of the drive shaft 14, extends longitudinally from the upper portion of the reactor vessel (not shown) to the top of the control rod drive mechanism (not shown) and is engaged by the control rod drive mechanism during withdrawal or insertion of the control rod 10. The tubularly shaped drive shaft 14 has a longitudinal opening 42 extending throughout its entire length..

A disconnect rod 44, which extends from the lower end of the locking mechanism 28 to the lower end of the coupling unit 32 has a shoulder 46 at a location from the top of the disconnect rod 44 approximately one-fourth of the entire length of the disconnect rod 44. Prior to insertion of the disconnect rod 44 through the drive shaft 14, a sleeve 48 having a collar 50 is slidably placed over the top of the disconnect rod 44 and lowered until the collar 50 engages the shoulder 46. The sleeve 48 extends upwardly from the collar 50 for a purpose to be described hereinafter. A rod spring 52 is then slidably placed over the disconnect rod 44 and the disconnect rod sleeve 48 and against the collar 50. A tubularly shaped top spring retainer 54 is then slidably placed over the top of the disconnect rod 44 and bears against the top of the rod spring 52. An annular groove 56 is also formed on the outer periphery of the top spring retainer 54.

*Locking mechanism*

A sleeve or ball cage 58, which is substantially tubular throughout its entire length, has a longitudinally threaded opening 60 at its lower end and a solid transverse partition 62 directly above the threaded opening 60. The remainder of the ball cage 58 above the partition 62 is tubular in shape and has an external threaded portion 64 at the upper end. A short distance above the partition 62 the ball cage 58 has a plurality of radial openings 66 in the same horizontal plane. In this example of the invention, there are three such radial openings 66 in the ball cage 58. The ball cage 58 is then threaded onto the disconnect rod 44, which has a threaded upper portion, as indicated by reference number 68, until the top of the disconnect rod 44 contacts the bottom of the partition 62. The ball cage 58 is then locked to the disconnect rod 44 by a lock pin 70, which is inserted transversely through the ball cage 58 and substantially into the disconnect rod 44. The disconnect rod 44 and its related, previously assembled parts are slidably inserted into the top of the drive shaft 14 as far as the radial openings 66 in the ball cage 58.

A short distance below the top of a locking member or push rod 72 is formed a collar 74, which is an integral part of the push rod 72. At the lower portion of the push rod 72 is formed an annular indentation or groove 76 in the outer periphery of the push rod 72. The groove 76 also has a camming surface 78 at its lower end. A push rod spring 80 is then inserted over the push rod 72 from its lower end. The push rod 72 is then inserted into the top of the ball cage 58 and held in place by partially threading a tubularly shaped operating handle or disconnect button 82 onto the upper portion of the ball cage 58, as indicated by reference character 64. The disconnect button 82 has a notch 84 and camming surfaces 86, which are similar to the drive shaft notch 34 and the drive shaft camming surfaces 36 previously described. The purpose of the notch 84 is to provide a means by which a remote handling tool (not shown) can lift the disconnect button 82. At the upper end of the disconnect button 82 is formed an inwardly extending annular lip 88, against which the push rod collar 74 normally bears. The push rod 72 is then pressed into the ball cage 58 until the groove 76 in the push rod 72 can be seen through the openings 66 in the ball cage 58. A retaining member or ball 90 is then placed in each of the three openings 66 formed in the ball cage 58. An annular indent or notch 92 having upper and lower camming surfaces 94 and 96, respectively, is formed in the inner periphery of the drive shaft 14 at a point a short distance below the shaft notch 34 on the outer periphery of drive shaft 14. The annular opening 97 (FIG. 2), formed in the drive shaft 14 by the notch 92 and the camming surfaces 94 and 96, is large enough to receive a portion of each ball 90. A short distance below the notch 92 and at the inner periphery of the drive shaft are formed two countersunk, parallel openings 98, which extend substantially through the drive shaft 14 in a transverse direction to the longitudinal axis of the drive shaft 14 and have countersunk portions 100 facing in the same direction as shown in FIG. 3. While holding the push rod 72 pressed into the ball cage 58, the previously assembled components are inserted further into the drive shaft 14 until the groove 56 in the top spring retainer 54 is aligned with the two transverse openings 98 in the drive shaft 14. A lock pin 102 is then inserted in each of the transverse openings 98 so as to lock the top spring retainer 54 to the drive shaft 14. The push rod 72 is then released.

However, the push rod 72 will not move upon being released, because the balls 90 are located a short distance below the notch 92 and are contained partially within the radial openings 66 in the ball cage 58 and partially within the groove 76 in the push rod 72 thereby preventing relative motion between the push rod 72 and the ball cage 58. The disconnect button 82 is then threaded further onto the ball cage 58, until the ball cage 58 hangs up on the balls 90. This is caused by the fact that the ball cage 58 is being raised relative to the drive shaft 14 by threading the disconnect button 82 further onto the ball cage 58, while the bottom of the disconnect button 82 is simultaneously making contact with the top of the drive shaft 14. As the ball cage 58 is raised, a gap 104 is created between the top spring retainer 54 and the bottom of the ball cage 58. In addition, as the ball cage 58 is raised, it raises the balls 90 until they reach a position opposite the notch 92 in the drive shaft 14. At this point the push rod spring 80, which is still in a compressed position, acts against the collar 74 on the push rod 72 forcing the push rod 72 in an upwardly direction. As the push rod 70 is forced upwardly, the camming surface 78 forces the balls 90 out of the groove 76 and into the notch 92 and thereby locks the ball cage 58 to the drive shaft 14. The balls 90 are then kept in this position by the lower portion of the push rod 72, which has a full diameter and has been raised opposite to the balls 90 by the push rod spring 80. The upward travel of the push rod 72 is then stopped by the collar 74 coming in contact with the lip 88 at the top of the disconnect button 82. The disconnect button 82 is then backed off one-half turn, so as to lower the ball cage 58 a slight amount to permit the balls 90 to rest loosely in the notch 92 in the drive shaft 14 and the openings 66 in the ball cage 58. During the above procedure, the ball cage 58 is kept from turning by holding the lower end of the disconnect rod 44 by any suitably shaped tool. The disconnect button 82 is then locked to the ball cage 58 by transversely inserting a plurality of lock pins 106, with two such lock pins 106 being used in this example, through the lower portion of the disconnect button 82 and substantially through the wall of the ball cage 58.

Latching mechanism

A short distance above the bottom of the drive shaft 14 an annular shoulder 108 is formed at the inner periphery of the drive shaft 14 (FIG. 1C). A tubularly shaped lower spring retainer 110, a locking spring 112 and a locking button 114 are slidably inserted over the disconnect rod 44 from its lower end. The locking button 114 is tubular in shape and has its outer periphery rounded at its lower end, as indicated by reference character 115. A tubularly shaped release button 116 is threaded onto the lower portion of the disconnect rod 44, as indicated by reference character 118, until it makes contact with a shoulder 120 formed at the lower end of the disconnect rod 44. The release button 116 thus holds in place the three aforementioned parts previously inserted over the lower portion of the disconnect rod 44. The release button 116 is then locked in place by locking pin 122, which is inserted transversely through the release button 116 and into the disconnect rod 44.

Referring now particularly to FIGS. 1C and 4 of the drawings, the coupling unit 32 comprises a tubularly shaped thickened portion 124, a plurality of flexure members or arms 126, and a plurality of latching members or coupling fingers 128. The tubular portion 124 has external and internal threads, as indicated by reference characters 130 and 132 respectively. Annular upper and lower shoulders 134 and 135 respectively are also formed on the external periphery of the tubular portion 124. Integrally affixed to the bottom of the tubular portion 124 are the flexure arms 126, with this example of the invention having two such flexure arms 126. Each flexure arm 126 extends downwardly from the tubular portion 124 and has a relatively straight, ribbon-type form. The thickness of each flexure arm 126 is relatively thin in order to permit flexing of the flexure arm 126, with the tubular portion 124 serving as a pivotal point for the flexing of each flexure arm 126, as indicated by reference character 136. To the bottom of each flexure arm 126 is integrally affixed a coupling finger 128. Each coupling finger 128 has the general shape of a tubular segment. On the outer periphery of each coupling finger 128 are formed a plurality of parallel annularly shaped teeth 138, which engage mating teeth 140 formed on each upper arm 142 of the control rod 10. On the inner periphery of the coupling finger 128 and opposite the toothed portion of the coupling finger 128 is formed an annular taper 144 against which the rounded portion 115 of the locking button 114 is forced by the locking spring 112. Insertion of the coupling fingers 128 into the inner periphery of the control rod arms 142 is facilitated by chamfering the lower end of the coupling fingers 128, as indicated by the reference character 146. In this example of the invention, each coupling finger 128 engages two upper control rod arms 142, as shown in FIG. 4. Associated with the coupling unit 32 is a coupling guide 148. The coupling guide 148 is generally cylindrical in shape and has a number of radial slots 150 formed therein, which extend longitudinally in the coupling guide 148 so that each slot 150 can receive its corresponding upper control rod arm 142. The slot 150 extends from the bottom of the coupling guide 148 to a point a short distance above the upper control rod arms 142, as indicated by reference character 152 (FIG. 1C). In this example of the invention, the slots 150 are formed at right angles to one another and correspond to the number of arms 142 of the control rod 10, with four slots 150 being utilized in this example of the invention. The coupling guide 148 is adapted to engage the upper end of the control rod 10 by insertion of the upper control rod arms 142 thereof into the slots 150. This insertion is facilitated by chamfering the lower end of the coupling guide 148 at locations adjacent (not shown) the slots 150.

Prior to connecting the coupling unit 32 to the lower end of the drive shaft 14, the coupling guide 148 is threaded onto the tubular portion 124 of the coupling unit 32, until the guide contacts the lower shoulder 135 of the tubular portion 124. The coupling guide 148 is then backed off until it is aligned with the coupling unit 32, as shown in FIG. 4. An angular machined shim 154 is then installed so as to bear tightly against the upper shoulder 134 and the top surface of the coupling guide 148. A lock pin 156 is then transversely inserted through the coupling guide 148 and partially into the tubular portion 124, so as to maintain the proper alignment between the coupling guide 148 and the coupling unit 32.

Dashpot

When the control rod 10 is scrammed in order to terminate quickly the chain reaction in the reactor core, the shock energy of the downward termination thereof is absorbed by a shock absorber or dashpot 30 (FIG. 1B). The dashpot 30 comprises an inverted cup member 158 rigidly secured to the drive shaft 14 in a manner to be described hereinafter, an opposing cup member 160 mounted for sliding movement along the length of the drive shaft 14, and a dashpot spring 162 which normally maintains the cups 158 and 160 in a spaced position. The inverted cup member 158 has a flange 164 formed at its upper end, which has a diameter which is less than the inside diameter of the shroud tube 12. The flange 164 creates a drag or decelerating force during the downward movement of the control rod 10, because of the opposition created by the downward movement of the flange 164 through the water surrounding it. The amount of drag created by the flange 164 is determined by the opening between the flange 164 and the shroud tube 12, since a larger gap permits a larger rate of water to escape from underneath the flange 164 and thus create less drag. The inverted cup member 158 also has at least one small radial opening 166 at its upper end to vend any gas entrapped within the dashpot 30. The opposing cup member 160 is tapered longitudinally, as indicated by reference character 168. The greater the overlap becomes between the cups 158 and 160, the smaller the gap between the two cups 158 and 160 becomes thus resulting in a lesser rate of water escaping from within the dashpot 30 through the aforementioned gap. This, therefore, provides a means of controlling the rate at which the water within the dashpot 30 can escape, which in turn controls the amount of drag produced by the water entrapped within the dashpot 30. The opposing cup member 160 also has a flange 172 formed at its lower end. The diameter of the flange 172 is sufficiently large, so that the flange 172 can make contact with the top of the inner portions of the dashpot stop 18.

A lock ring 174 and the inverted cup member 158 is threaded on the drive shaft 14, as indicated by reference character 176. The dashpot spring 162 and the opposing cup member 160 is then slidably inserted over the drive shaft 14. The dashpot spring 162 is then collapsed sufficiently to permit the threading of the coupling unit 32 with its associated coupling guide 148 onto the lower end of the drive shaft 14, as indicated by reference character 132, until the coupling unit 32 comes in contact with a shoulder 178 formed on the drive shaft 14. The coupling unit 32 and the coupling guide 148 are then fixed to the drive shaft 14 by transversely inserting a plurality of lock pins 156 through the coupling guide 148, through the coupling unit 32 and partially into the drive shaft 14. The inverted cup member 158 is then turned on its threads so as to obtain the proper length of dashpot stroke between the cups 158 and 160. The inverted cup member 158 is then fixed to the drive shaft 14 by transversely inserting a plurality of lock pins 180 through the cup member 158 and into the drive shaft 14. The lock ring 174 is next threaded against the top of the inverted cup member 158 with a predetermined amount of torque. The lock ring 174 is then fixed to the drive shaft 14 by transversely inserting a lock pin 182 through the lock ring 174 and partially into the drive shaft 14. All lock pins, previously mentioned, are installed flush or slightly inside the outer surface of the outer member through which the lock pin has been inserted. All lock pins are then trapped into position by any means well known in the art, such as by welding or by peening the circumference of the hole in which the lock pins were inserted.

*Operation.—Control rod unlatching*

Starting with the control rod 10 fully inserted in the reactor core (not shown), the uncoupling of the control rod 10 from the drive shaft 14 will first be described, because the accompanying drawings show the relative position of all components with the control rod 10 in the fully inserted position. First the push rod 72 is fully depressed and held in that position against the opposing force of the push rod spring 80. This aligns the groove 76 in the push rod 72 with the radial openings 66 in the ball cage 58. The disconnect button 82 is then firmly grasped at the notch 84 and lifted. The upward movement of the disconnect button 82 causes the ball cage 58 to move in an upwardly direction, as the ball cage 58 is firmly fixed to the disconnect button 82 by the lock pins 106. The upward movement of the ball cage 58 forces the balls 90 against the upper camming surface 94 in the drive shaft 14, which forces the balls 90 into the groove 76 and out of the notch 92 in the drive shaft 14. This permits the ball cage 58 to move in an upwardly direction while the drive shaft 14 remains stationary. As soon as the balls 90 have been lifted above notch 92, the push rod 72 can be released. However it is desirable to keep the push rod 72 depressed so as to permit the balls 90 to roll freely against the inner surface of the drive shaft 14 during their upward movement. If the push rod 72 is released, the push rod spring 80 will produce an upward force against the collar 74 and thereby produce an upward force by the camming surface 78 against the balls 90, thus forcing the balls 90 against the inner surface of the drive shaft 14. This will produce a greater frictional force during the upward movement of the balls 90, because the balls 90 are forced against the inner surface of the stationary drive shaft 14. As the disconnect rod 44 is fixed to the ball cage 58 by the lock pin 70, the upward movement of the disconnect button 82 also causes the disconnect rod 44 to move in an upwardly direction. The disconnect rod 44 moves slidably upwardly through the top spring retainer 54, which is fixed to the drive shaft 14 by means of lock pins 102 and, therefore, remains in a stationary poistion. The upward movement of the disconnect rod 44 also causes the shoulder 46 on the disconnect rod 44 to act against the collar 50 and its related disconnect rod sleeve 48 thereby compressing the rod spring 52 against the stationary top spring retainer 54. The upward movement of the disconnect button 82 is halted when the disconnect rod sleeve 48 comes in contact with the botom of the stationary top spring retainer 54. The contact between the disconnect rod sleeve 48 and the top spring retainer 54 occurs before the balls 90 arrive at the top of the drive shaft 14. Otherwise, if the balls 90 were permitted to be raised above the drive shaft 14, the balls 90 would roll out of the radial openings 66 and fall on the outside of the drive shaft 14 and result in a possible loss of the balls 90 in the reactor core. The upward movement of the disconnect rod 44 also raises the release button 116, which is fixed to the disconnect rod 44 by the lock pin 122. The disconnect rod 44 moves slidably through the locking button 114 until the release button 116 makes contact with the locking button 114. The further movement upward of the disconnect rod 44 then causes the release button 116 to force the locking button 114 in an upward direction. The disconnect rod 44 must be raised until the bottom of the release button 116 is a short distance above the top of the tapered portion 144 on the inner surface of the coupling fingers 128 to permit sufficient inward movement of the coupling fingers 128 in order to allow the complete disengagement of the teeth 138 on the coupling fingers 128 from the mating teeth 140 on the upper control arms 142. In addition, as the locking button 114 is raised, the locking button 114 compresses the locking spring 112 against the lower spring retainer 110, which is kept in a stationary position by the lower spring retainer 110 bearing against the shoulder 108 on the drive shaft 14.

After the release button 116 has been raised to its proper position as previously described, the drive shaft 14 is firmly grasped at the notch 34. The drive shaft 14 is then raised while simultaneously raising the disconnect button 82, so as to maintain the same relative position between the release button 116 and the coupling fingers 128. Lifting of the drive shaft 14 will also raise the coupling unit 32 and the coupling guide 148 as both are fixed to the drive shaft 14 by the lock pins 156. As the coupling unit 32 is raised, the teeth 138 and 140 will produce a camming action which will force the coupling fingers 128 inwardly, so as to uncouple completely the coupling fingers 128 from the upper control rod arms 142. Reliable uncoupling up to a friction coefficient of about 0.8 is assured by conservative selection of tooth angles. The inward movement of the coupling fingers 128 simultaneously causes the flexure arms 126 to flex inwardly from their pivotal point 136. As soon as the coupling fingers 128 are raised above the top of the upper control arms 142, the disconect button 82 can be released. Upon releasing the disconnect button 82, the previously compressed rod spring 52 acts against the collar 50. The collar 50 then acts against the disconnect rod shoulder 46 and forces the disconnect rod 44 in a downward direction until the disconnect button 82, which is fixed to the disconnect rod 44 through the ball cage 58, comes in contact with the drive shaft 14. Simultaneously, the previously compressed locking spring 112 acts against the locking button 114 and forces the latter in a downward direction, until the locking button 114 makes contact with the tapered portion 144 on the coupling fingers 128 thereby urging the coupling fingers in an outward direction. Further removal of the drive shaft 14 and all related components can now be accomplished by merely lifting the drive shaft 14 by use of a remote handling tool (not shown) in conjunction with the notch 34.

As the drive shaft 14 is raised, it slidably passes through the opposing cup member 160 and simultaneously raises the inverted cup member 158, which is fixed to the drive shaft 14 by lock pins 180, until there is only a slight overlap between the cups 158 and 160. At this point, the coupling unit 32 comes in contact with the bottom of the opposing cup member 160 and begins to raise the cup member 160 with any additional upward movement of the drive shaft 14, so as to maintain a constant overlap between the cups 158 and 160.

The drive shaft 14 can also be raised by merely lifting the disconnect button 82 without having to grasp and lift separately the drive shaft 14 at the notch 34. This can be accomplished by raising the disconnect button 82, as previously described. In this alternate method, however, the disconnect button 82 is raised until the disconnect rod sleeve 48 comes in contact with the top spring retainer 54, which is fixed to the drive shaft 14 as previously described. As the disconnect button 82 and the disconnect rod 44 are lifted further, the disconnect rod 44 continues to bear against the disconnect rod sleeve 48 through the disconnect rod shoulder 46. The disconnect rod sleeve 48 then lifts the top spring retainer 54 which in turn lifts the drive shaft 14, as the top spring retainer 54 is fixed to the drive shaft 14 as previously described. In this manner, the disconnect button 82 can be used to raise the drive shaft 14 and all related components.

Control rod latching

To couple the drive shaft 14 to the control rod 10, the drive shaft 14 is lowered until the bottom of the coupling unit 32 comes in contact with the top of the upper control rod arms 142. The drive shaft 14 is then rotated until the upper control rod arms 142 become aligned with their associated slots 150 in the coupling guide 148. The drive shaft 14 is then lowered until the coupling unit 32 comes in contact with the teeth 140 on the control rod arms 142. The locking button 114 is then raised in the same manner as previously described. The drive shaft 14, with the locking button 114 in its raised position, is then lowered until the coupling unit 32 fully engages the upper control rod arms 142 in a similar manner as previously described for the unlatching of the coupling unit 32 from the upper control rod arms 142. The coupling unit 32 is prevented from being lowered too far as the bottom of the coupling unit 32 will be stopped in its downward movement by the top of the cruciform control rod 10, as indicated by reference character 184. However, the coupling unit 32 can be lowered until it makes contact with the top surface 184 of the control rod 10. At this point the disconnect button 82 can be released so as to permit the locking button 114 to bear against the tapered portion 144 on the coupling fingers 128. At this point the tips of the teeth 138 and 140 are opposite each other. Therefore, a slight upward movement on the drive shaft 14 causes the teeth 138 and 140 to become properly engaged, as the locking button 114 bearing against the coupling fingers 128 forces the teeth 138 and 140 to become properly engaged with the aid of the camming action produced by the faces of the teeth 138 and 140. Even with friction coefficients among the teeth 138 and 140 as low as 0.2 in certain applications of the invention, unlatching of the control rod is prevented by the force of locking spring 112 against the locking button 114 which forces the coupling fingers 128 against the upper control rod arms 142.

Dashpot compression

Upon the gravitational descent of the control rod 10, the drive shaft 14, and associated mechanism, the opposing cup member 160 is stopped in its downward descent when the cup 160 contacts the upper end of the dashpot stop 18. Although the opposing cup member 160 is stopped, the inverted cup member 158 continues its downward descent over the cup 160. As the cup 158 does so, the control rod 10 is decelerated by the compression of the dashpot spring 162, the previously described drag produced by the flange 164 on the cup 158, and the previously described controlled escape of the water within the dashpot 30. A gap 170 is maintained between the lower end of the inverted cup member 158 and the flange 172 on the opposing cup member 160 by the bottom of the control rod 10 coming in contact with a control rod positioner (not shown) located at the bottom of the reactor vessel. The control rod 10 contacts the positioner near the end of the downward travel of the control rod 10. The aforementioned control rod positioner (not shown), therefore, prevents the lower end of the inverted cup member 158 from striking the flange 172 on the opposing cup member 160.

It is, therefore, apparent that there has been disclosed a locking mechanism 28 built into the disconnect button 82. The locking mechanism 28 comprises a push rod 72, operated by a push rod spring 80, and the balls 90. The disconnect button 82 is firmly locked to the drive shaft 14, when the balls 90 are forced into the notch 92 in the drive shaft 14. Unlatching of the coupling unit 32 from the control rod 10 requires a depression of the push rod 72 and then the lifting of the disconnect button 82 while simultaneously holding the push rod 72 in a depressed position. Therefore, the control rod 10 cannot be inadvertently uncoupled from the drive shaft 14.

From the foregoing it will be apparent that a novel and positive latching arrangement has been disclosed. The latching arrangement of the invention, although described herein in connection with a control rod driving mechanism associated with a nuclear reactor, obviously can be adapted for use in other latching applications and in particular in those applications requiring a compact latching device.

While there has been shown and described what is at present considered to be the preferred embodiment of the invention, modifications thereto will readily occur to those skilled in the art. It is not desired, therefore, that the invention be limited to the specific arrangements shown and described; and it is intended to cover in the appended claims all such modifications as fall within the true spirit and scope of the invention.

What is claimed as new is:

1. A coupling assembly comprising a driven member having a plurality of longitudinally extending arms at one end thereof; a plurality of parallel arcuately disposed teeth formed on the inner periphery of said arms; an elongated hollow driving shaft for said driven member; a pair of opposed arcuate latching members longitudinally extending adjacent one end of said driving shaft, each of said latching members having a plurality of parallel arcuate teeth formed on the outer periphery of said latching member in a complementary relationship with said teeth on said arms and a longitudinally tapered portion on the inner surface of each of said latching members; a pair of flexing members longitudinally extending at one end of said driving shaft and joining said latching members to said one end of the driving shaft; a disconnect rod extending coaxially through said driving shaft, said disconnect rod having an operating handle protruding from the other end of said driving shaft; means for biasing said disconnect rod toward said driven member; an annular locking button slidably disposed on a portion of said rod adjacent said the latching members and having an outer surface engageable with said tapered portions on said latching members; means for biasing said button against said latching members; and an annular release member secured coaxially to said one end of said disconnect rod and within the most inwardly extending portions of said latching members, said release member being movable away from said driven member and also engageable with said button.

2. A coupling assembly comprising a driven member having a cruciform cross sectional configuration and having a plurality of longitudinally extending arms at one end thereof; a plurality of parallel arcuately disposed teeth formed on the inner periphery of said arms; an elongated hollow driving shaft for said driven member; a pair of opposed arcuate latching members longitudinally extending adjacent one end of said driving shaft, each of said latching members having a plurality of parallel arcuate teeth formed on its outer periphery in complementary relationship with said teeth on said arms and a longitudinally tapered portion on the inner surface of each said latching members; a pair of flexing members longitudinally extending at one end of said driving shaft and joining said latching members to said one end of the driving shaft; a disconnect rod extending coaxially through said driving shaft, said disconnect rod having an operating handle protruding from the other end of said driving shaft; means for biasing said disconnect rod toward said driven member; an annular locking button slidably disposed over a portion adjacent one end of said disconnect rod and having an outer surface engageable with said tapered portions on said latching members; means for biasing said button against said latching members; and an annular release member secured coaxially to the one end of said disconnect rod and within the most inwardly extending portions of said latching members, said release member being movable away from said driven member to a position above said tapered portions on said latching members before permitting the complete disengagement of said latching members from said arms and also engageable with said button.

3. A coupling assembly comprising a driven member having an offset cruciform cross sectional configuration and having a plurality of longitudinally extending arms at one end thereof; a plurality of parallel arcuately disposed teeth formed on the inner periphery of said arms; an elongated hollow driving shaft for said driven member, said shaft terminating at one end thereof in a hollow cylindrical body having a plurality of radial slots formed longitudinally therein, said slots corresponding in number to that of the arms of said driven member, and said arms being inserted into said slots; a pair of opposed arcuate latching members coaxially disposed within said cylindrical body, each of said latching members having a plurality of parallel arcuate teeth formed on its outer periphery in complementary relationship with said teeth on said arms and a longitudinally tapered portion on the inner surface of each said latching members; a pair of flexing members longitudinally extending within said cylindrical body and joining said latching members to said one end of the driving shaft, said flexing members being disposed to bias said latching members inwardly of said cylindrical body; a disconnect rod extending coaxially through said driving shaft, said disconnect rod having an operating handle protruding from the other end of said driving shaft; means for biasing said disconnect rod toward said driven member; an annular locking button slidably disposed over a portion adjacent one end of said disconnect rod and having an outer surface engageable with said tapered portions on said latching members; means for biasing said button against said latching members; and an annular release member secured coaxially to the one end of said disconnect rod and within the most inwardly extending portions of said latching members, said release member being movable away from said driven member to a position above said tapered portions on said latching members before permitting the complete disengagement of said latching members from said arms and also engageable with said button after moving a predetermined distance.

4. A coupling mechanism comprising a plurality of latching members engageable with a driven member, a support, a plurality of flexing members joining said latching members to said support, spring biased means for outwardly flexing said latching members into engagement with the driven member to be coupled and for locking said latching members to the driven member, and releasing means movable to disengage said spring biased means, said releasing means at its normal position blocking said latching members to prevent unlatching movement of said latching members until said releasing means is moved a short distance from its normal position to engage and effect disengagement of said spring biased means.

5. The combination of claim 1 wherein said release member when its normal position is located between the most inwardly extending portions of said latching members, is spaced from said locking button, and has a periphery sufficiently large to prevent the disengagement of said teeth on said latching members from said teeth on said arms.

6. The combination of claim 4 wherein said releasing means is independent of said spring biased means and is normally spaced therefrom.

7. A coupling assembly comprising a driven member having at least one extension at one end thereof; a plurality of parallel teeth formed on the inner surface of said extension; an elongated hollow driving shaft for said driven member; a pair of opposed latching members longitudinally extending adjacent one end of said driving shaft, each of said latching members having a plurality of parallel teeth formed on the outer surface of said latching member in a complementary relationship with said teeth on said extension and a longitudinally tapered portion on the inner surface of each of said latching members; a pair of flexing members longitudinally extending at one end of said driving shaft and joining said latching members to said one end of the driving shaft; a disconnect rod extending coaxially through said driving shaft; means for biasing said disconnect rod toward said driven member; an annular locking button slidably disposed on a portion of said rod adjacent said latching members and having an outer surface engageable with said tapered portions on said latching members; means for biasing said button against each of said tapered portions to force the teeth on said latching members into engagement with the teeth on said extension; and releasing means mounted on said rod, said releasing means being movable away from said driven member and also engageable with said button to permit disengagement of said driving member from said driven member.

8. A coupling mechanism comprising a movably mounted driving shaft, said driving shaft being elongated and hollow, at least one latching member disposed adjacent one end of said driving shaft and engageable with a driven member, said latching member having at least one projection formed in the outer surface thereof and said driven member having at least one groove formed in the inner surface thereof, a resilient member joining said latching member to said driving shaft and normally maintaining said latching member substantially disengaged from the driven member, a rod slidably mounted on said driving shaft and extending coaxially through said driving shaft, means for biasing said rod towards said driven member, spring biased means slidably disposed on a portion of said rod adjacent said latching member for continuously forcing said latching member towards the driven member to force the projection into engagement with the groove, and a releasing means mounted on said rod and movable to disengage said spring biased means from said latching member to permit disengagement of said driving member from the driven member.

9. A coupling mechanism comprising a movably mounted driving shaft, at least one latching member disposed adjacent one end of said driving shaft and engageable with a driven member, said latching member having at least one projection formed in the outer surface thereof and having a longitudinally tapered portion on its inner surface, said driven member having at least one groove formed in the inner surface thereof, said groove having inwardly converging side walls for engagement with the projection on said latching member and said projection having outwardly converging sides dimensioned to engage opposite walls of the groove before engaging the bottom thereof, a resilient member joining said latching member to said driving shaft and normally maintaining said latching member substantially disengaged from the driven member, a rod mounted on said driving shaft, and a locking button slidably disposed on a portion of said rod adjacent said latching member and spring biased into engagement with the tapered portion of said latching member to force the projection into the groove to form a rigid driving connection between said members.

References Cited by the Examiner

UNITED STATES PATENTS

| | | | |
|---|---|---|---|
| 65,169 | 5/1867 | Card | 294—94 |
| 1,159,262 | 11/1915 | Ottum | 294—92 |
| 1,580,352 | 4/1926 | Ventresca | 294—86.25 |
| 1,897,561 | 2/1933 | Manucci et al. | 294—94 |
| 2,179,594 | 11/1939 | Johnson | 294—94 |
| 2,445,106 | 7/1948 | Dempster | 294—83 |
| 2,894,779 | 7/1959 | Kushner et al. | 294—83 |
| 2,961,393 | 11/1960 | Monson | 204—193.2 |
| 2,968,205 | 1/1961 | Springate. | |
| 3,036,964 | 5/1962 | Horning | 204—154.2 |
| 3,107,209 | 10/1963 | Frisch | 294—95 X |

M. HENSON WOOD, JR., *Primary Examiner.*

REUBEN EPSTEIN, ANDRES H. NIELSEN, SAMUEL F. COLEMAN, ROBERT B. REEVES, *Examiners.*

M. DINNIN, J. ERLICH, *Assistant Examiners.*